United States Patent
Wawrla et al.

(10) Patent No.: US 10,246,858 B2
(45) Date of Patent: Apr. 2, 2019

(54) MONITORING APPARATUS FOR A SANITARY INSTALLATION

(71) Applicant: Aquis Systems AG, Rebstein (CH)

(72) Inventors: Andreas Wawrla, Rebstein (CH); Kurt Wallerstorfer, Strasswalchen (AT)

(73) Assignee: Aquis Systems AG, Rebstein (CH)

( * ) Notice: Subject to any disclaimer, the term of this patent is extended or adjusted under 35 U.S.C. 154(b) by 0 days.

(21) Appl. No.: 15/784,431

(22) Filed: Oct. 16, 2017

(65) Prior Publication Data

US 2018/0112379 A1 Apr. 26, 2018

(30) Foreign Application Priority Data

Oct. 20, 2016 (DE) .................. 10 2016 120 016

(51) Int. Cl.
| | | |
|---|---|---|
| E03C 1/05 | (2006.01) | |
| G01S 17/02 | (2006.01) | |
| H04Q 9/02 | (2006.01) | |
| F16K 31/02 | (2006.01) | |

(52) U.S. Cl.
CPC ............ *E03C 1/057* (2013.01); *G01S 17/026* (2013.01); *H04Q 9/02* (2013.01); *F16K 31/02* (2013.01)

(58) Field of Classification Search
CPC .......... E03C 1/057; E03C 1/05; G01S 17/026; G01S 17/06; G01S 17/40; H04Q 9/02
USPC ... 340/539.22, 539.23, 539.26, 573.1, 573.3; 342/27, 28; 251/129.04
See application file for complete search history.

(56) References Cited

U.S. PATENT DOCUMENTS

| | | | |
|---|---|---|---|
| 5,086,526 A | 2/1992 | Van Marcke | |
| 5,458,147 A | 10/1995 | Mauerhofer | |
| 5,743,511 A * | 4/1998 | Eichholz | E03C 1/057 251/129.04 |
| 5,943,712 A | 8/1999 | Van Marcke | |
| 6,178,572 B1 | 1/2001 | Van Marcke | |
| 6,250,601 B1 * | 6/2001 | Kolar | E03C 1/057 251/129.04 |
| 6,388,609 B2 * | 5/2002 | Paese | E03C 1/057 340/565 |

(Continued)

FOREIGN PATENT DOCUMENTS

| | | |
|---|---|---|
| DE | 10 2007 011 183 B4 | 4/2014 |
| EP | 0 423 102 A1 | 4/1991 |

(Continued)

OTHER PUBLICATIONS

Extended European Search Report dated Mar. 22, 2018 from a corresponding European patent application (EP 17195865.5), 8 pages.

*Primary Examiner* — Hung T Nguyen

(74) *Attorney, Agent, or Firm* — Burr & Brown, PLLC

(57) ABSTRACT

Proposed is a monitoring apparatus for a sanitary installation, comprising a first sensor for monitoring the presence of persons in a first spatial region in the surroundings of the sanitary installation and comprising a second sensor for monitoring a second spatial region in the surroundings of the sanitary installation, wherein the first sensor comprises an operating mode and a standby mode and the second sensor is embodied to switch the first sensor from a standby mode into an operating mode in the case of a predetermined detection. In order to avoid faults in the operating procedure, the first sensor is embodied as a distance sensor, in particular as a TOF sensor.

15 Claims, 3 Drawing Sheets

(56) References Cited

U.S. PATENT DOCUMENTS

| | | | |
|---|---|---|---|
| 7,464,418 B2* | 12/2008 | Seggio | E03C 1/05 |
| | | | 251/129.04 |
| 9,057,182 B1* | 6/2015 | Friedman | E03C 1/18 |
| 2010/0148971 A1 | 6/2010 | Wawrla et al. | |
| 2015/0268342 A1 | 9/2015 | Iott et al. | |
| 2015/0355707 A1 | 12/2015 | Schindler et al. | |
| 2016/0086419 A1* | 3/2016 | Geigel | G07F 9/026 |
| | | | 700/237 |
| 2017/0335553 A1 | 11/2017 | Martin | |

FOREIGN PATENT DOCUMENTS

| | | |
|---|---|---|
| EP | 0 632 290 A1 | 1/1995 |
| FR | 3 026 119 A1 | 3/2016 |
| WO | 2014/111286 A1 | 7/2014 |

\* cited by examiner

MONITORING APPARATUS FOR A SANITARY INSTALLATION

This application claims the benefit under 35 USC § 119(a)-(d) of German Application No. 10 2016 120 016.6 filed Oct. 20, 2016, the entirety of which is incorporated herein by reference.

FIELD OF THE INVENTION

The present invention relates to a monitoring apparatus for a sanitary installation.

BACKGROUND OF THE INVENTION

By way of example, the prior art has disclosed, in DE 10 2007 011 183 B4, an electrically actuatable sanitary fitting with a proximity sensor with a large reception range and a further sensor with a short reception range, wherein the proximity sensor with the long range is embodied to transfer an electronic control unit from a sleep mode into an operating mode when the presence of a user is detected. In this case, the short-range sensor can be operated via the control unit and optionally switch the fitting.

SUMMARY OF THE INVENTION

It is an object of the present invention to be able to provide a monitoring apparatus for a sanitary installation, in which a faulty operating procedure can be avoided.

Accordingly, the monitoring apparatus according to the present invention for a sanitary installation comprises a first sensor for monitoring the presence of persons in a first spatial region in the surroundings of the sanitary installation and, moreover, a second sensor for monitoring a second spatial region in the surroundings of the sanitary installation.

In principle, these two spatial regions can be different and it is usually advantageous for one of the two spatial regions to have a larger embodiment than that of the other sensor such that it is possible, as a matter of principle, to check whether or not a person is present. By way of example, the second spatial region can be selected to be larger than the first spatial region because, for example, the second sensor, which monitors the second spatial region, serves, in principle, for monitoring whether persons are situated in the wider area of the sanitary fitting while the first sensor is responsible for the near region of the sanitary fitting.

The first sensor has an operating mode and a standby mode, with the sensor carrying out detections in the operating mode while there is an energy saving mode in the standby mode in which detections cannot be carried out or can be carried out only to a very restricted extent so that the power consumption can be kept low.

Particularly if a sensor is installed e.g. in a fitting, it is often desirable for the latter not to be connected to the power grid but to be operated by a battery or an accumulator. Since these only have a restricted service life or need to be recharged after a certain amount of time, however, it is desirable and advantageous to keep the power consumption as low as possible so that a replacement need not be carried out all too frequently on the fitting. In principle, it is also conceivable for the second sensor to be operated by way of a battery or an accumulator. In principle, this second sensor can also be integrated into the fitting. However, it is also possible for the second sensor to be arranged in the wider region of the sanitary installations, not in the vicinity of the fitting but, for example, in the vicinity of a door or on the ceiling in the entrance region.

In the case of a predetermined detection by the second sensor, the latter can switch the first sensor from the standby mode into the operating mode. Thus, when no user is present, the first sensor can remain in a standby mode and wait for a user to reach the wider area of the sanitary installation. If this is the case, the user is initially detected by the second sensor. By way of an appropriate signal from the second sensor, the first sensor thereupon is transferred into the operating mode and is now able to detect whether the user likewise appears in the first spatial region. If this is the case in turn, the first sensor can trigger a switching process by means of which the sanitary installation is operated or at least released for operation, e.g. a flush or the faucet is switched on or released for operation such that the water starts to flow or can now be switched on.

The monitoring apparatus according to the present invention is distinguished by virtue of the first sensor being embodied as the distance sensor, in particular, as a TOF sensor (TOF: time of flight). Such TOF sensors are advantageous in that a distance can be measured relatively accurately therewith. By way of example, a TOF sensor can operate according to the principle of emitting a light signal, the latter having modulated thereon a modulation signal which has a comparatively low frequency in relation to the light frequency. There are also variants of the TOF sensor in which a short light pulse is emitted, the time of flight of which can be determined directly. In general, various operating modes of a TOF sensor are possible.

Thereupon, a receiver, which is likewise part of the TOF sensor, is used to measure the phase shift such that the distance or the path difference which the light signal emitted by the transmitter has passed through is determinable herefrom. Correlation methods, for example, can be used in a TOF sensor to evaluate the times of flight or phase shifts; by way of example, the photo-induced charge carriers are therefore assigned to different collection units in subsequent time intervals by way of a shutter and buffer stored there. In this way, it is finally possible to determine the phase profile.

By way of example, false triggers can be avoided by the accuracy that is achieved by TOF sensors. While conventional sensors according to the prior art are embodied as e.g. purely reflection sensors, i.e. emit a signal by way of a transmitter and measure the intensity from the back-scattered signal using a receiver, TOF sensors in fact allow measurement of the distance, as already described above, without such a strong dependence on the reflectivity of an object, for which the distance to the TOF sensor is determined, playing a role. This is because the reflection sensors which are conventionally used according to the prior art operate, as a rule, according to the principle that objects that are situated close to the reflection sensor basically supply a reflected signal with a higher intensity than objects that are situated further away. If the transmitter emits into a solid angle, the emitted power is distributed over a greater area as the distance from the sensor increases. Consequently, the signal is attenuated more strongly as a result of the greater distance.

However, this basic idea by no means takes account of the fact that these sensors should be able to measure the distance to different objects with different physical properties. Different objects also have a different reflectivity, particularly if they have a different color scheme. The surface property also plays a large role. Usually, black bodies absorb more light than brighter bodies. If the sensor is at least partly directed into the basin of the sanitary installation, for example, a ceramic washbasin, a higher reflection thereof is to be expected on account of its shiny surface property and on account of the color that, as a rule, is white or bright. In particular, it should be noted that such sensors usually operate in the infrared range. In the infrared range, the reflection and emission characteristics of the individual objects once again behave differently than in the visible range of the light. As a consequence, there can be faulty triggers or incorrect estimations in apparatuses according to the prior art since the information relating to the distance determined thus, which is only based on considering an intensity, can only represent a rough estimate. In an advantageous way, the present invention can, therefore, not only ensure a more reliable operation but it is also possible to save energy and moreover reduce the water consumption.

Moreover, the combination of the first sensor with the second sensor allows the comparatively high power consumption of a TOF sensor to be reduced by virtue of the latter being able to remain in the standby mode for most of the time and only being switched on when it is really needed. The switchover between standby mode and an operating mode can be effectuated by way of the second sensor.

In an advantageous development of the present invention, the first sensor is embodied to monitor at least two portions of the first spatial region which represent spatial regions in the environment of the sanitary installation, with the first sensor further being embodied to switch the actuator of the sanitary installation on or off depending on the detection in one of the at least two portions. Depending on the detection in one of the other of the at least two portions, the actuator of the sanitary installation can either be switched on or off, or a quantitative setting of the actuator is undertaken. In principle, these at least two spatial regions can be overlapping or mutually separated spatial regions. To this end, the first sensor can comprise a plurality of partial sensors which each undertake the monitoring or this can relate to a TOF sensor which, like in the case of a quadrant diode, has various regions for different detection spaces that are to be monitored. To this end, the TOF sensors can have e.g. a receiver structure that is constructed from pixels or a matrix structure in the receiver.

In order to facilitate an alignment on different spatial regions, either the sensor or the sensors can be appropriately adjusted in terms of their alignment. However, it is also conceivable that provision is made of optics that are appropriately configured in such a way that the respectively desired spatial region or partial spatial region is monitored.

An application example that should be mentioned is that what may occur is that persons stand closer or further away from the sanitary fitting for different reasons, including as a result of inattention. What happens often is that, when washing hands, a person holds the hands directly under the outlet of the sanitary fitting. If the valve of the sanitary fitting for letting out the water is merely opened without the flow additionally being restricted appropriately, this can lead to the hands of the person being so close to the water outlet that the water splashes away and the person is sprayed with water. In order to avoid this, the proposed development offers the option of the valve letting the water out of the outlet with less strength and a lower pressure in such a case where the person or parts of the person are detected in a certain partial space. If the person changes their position or the position of their hands and moves the latter into, for example, the second partial space region, this is detected by the first sensor and the water can, for example, flow faster out of the outlet without the person becoming wet in the process.

However, it is moreover conceivable that certain movements are perceived and the fitting is switched in any other way, e.g. switched over into a shower operation or a single jet operation.

In principle, control units for control, i.e. open-loop and/or closed-loop control, of the fitting or actuators of the fitting can be provided in such embodiments of the present invention. In principle, such a control unit can be embodied separately or integrated into the sensor. It is also conceivable for the sensor to have an input which undertakes switching processes, for example, switching the respective sensor into the standby mode or into the operating mode, depending on a signal from a different sensor applied thereto.

In an advantageous embodiment variant of the present invention, or in an independent invention, provision can be made of a control unit for controlling the first sensor, the control unit being embodied to switch the first sensor from the operating mode into the standby mode depending on an output signal of the first sensor and of the second sensor. In this way, a particularly reliable operation can be ensured because the prior art, at best, often provides timers which thereupon switch the sensor or the actuator in the fitting. However, on its own, this is a very inaccurate method because, on the one hand, a person requiring longer use of the water needs to switch the water on again. If a sensor is switched into the standby mode after a certain amount of time, the latter no longer reacts to a person who remains for a relatively long time, and it is necessary to ensure that this sensor is switched on again in a different way. On the other hand, if a person, however, requires less time, either the water continues to flow because the actuator is not actuated or the sensor continues to detect for a relatively long period of time without still being required, for example, because the person has already left the space. However, according to the present embodiment variant, a detection can be carried out in the first spatial region and in the second spatial region as to whether a person is situated therein, i.e. both e.g. in the near region of the first spatial region and in e.g. a wider space of the second spatial region. If no one is detected herein, the person is situated neither in the vicinity of the fitting or the sanitary installation nor in the second spatial region in the surroundings of the sanitary installation, and so a transition into the standby mode of the first sensor appears to be justified. As a consequence, faults when e.g. only one sensor can no longer perceive the person, which is particularly the case when the first partial space and the second partial space only partly overlap, can also advantageously be avoided. It may also be the case that, depending on the position of the person, the first sensor or the second sensor can only perceive the latter with difficulties.

Beyond this, it is nevertheless conceivable to additionally wait for a predetermined time interval by way of a timer until there is a switchover into the standby mode. Optionally, the corresponding time intervals also can be selected to be very short. This also renders it possible to avoid faults if it is reasonable to expect that a person is not perceived simultaneously by both sensors for a short interval. Therefore, an undesired switch into the standby mode can be avoided in this case. By way of example, if the second sensor is a motion detector, it is conceivable that both sensors do not undertake a detection because the person is standing too far away from the washbasin for the first sensor (e.g. as a TOF sensor) and, at the same time, they are so still for a brief period of time that no movement can be perceived by a movement sensor in the form of the second sensor. Thus, if the two sensors do not have a detection at this instant, a timer can start to run, even for only a few seconds, so that a check is still carried out as to whether this state in fact prevails.

In an exemplary embodiment of the present invention, the first sensor or the control unit can be embodied only to evaluate or forward or continue processing those signals which lie in a predetermined distance range. As a result of this, it is possible to cover e.g. the region below the outlet opening of a faucet so that the water does not already begin to flow when a person approaches the washbasin and does not begin to flow either if the person e.g. grasps laterally the fitting and is not at all situated within the region covered by the water jet. This can also be used accordingly in the case of toilets. Optionally, a distinction can be made in this way as to whether e.g. a person wishes to operate or e.g. clean the sanitary installation and, therefore, approaches the sanitary installation more closely.

As already mentioned above, the second sensor can be embodied as a movement sensor. In particular, a motion detector is advantageously distinguished by its low energy consumption, as the expectation is that, as a rule, the second sensor must detect over a relatively long period of time and therefore is more often or over a longer period of time in the operating mode than the first sensor. In principle, the second sensor can operate by way of the detection of noises, but it can also detect e.g. thermal radiation or work in the infrared range.

In an advantageous development, the first sensor can be embodied to actuate an actuator of the sanitary installation. As a consequence, it can e.g. control the water flow and switch the latter on or off. This is possible in several ways. Firstly, the first sensor can be connected directly to the actuator to this end. It is conceivable that provision is made of an electronics unit which controls this actuator, regardless of whether the electronics unit is integrated into the actuator or present as a separate electronics unit and thereupon connected to the first sensor. Moreover, the sensor can deliver its output signals to the control unit, which accordingly switches the actuator on or off or subjects the latter to open-loop or closed-loop control.

In particular, the first sensor can thereupon be attached to the fitting in order to monitor a first spatial region in the direct vicinity of the sanitary fitting. In principle, it is also conceivable for the second sensor to be attached to the fitting and, for example, be aligned in such a way that the latter monitors a second spatial region. In this way, provision can be made of, in particular, very compact fittings or sanitary installations. However, it is also conceivable for the second sensor to be arranged separately in the space. The second sensor can communicate with e.g. the first sensor or an appropriate control unit in a wireless or wired manner.

In an exemplary embodiment of the present invention, the first sensor and the second sensor can also be integrated in a common sensor such that the required installation space can be selected to be very small. By way of example, this sensor can monitor a plurality of portions which are then assigned to the first or second spatial region.

In a preferred development of the present invention, the monitoring apparatus comprises a common sensor which assumes the functions of the first sensor and second sensor. In so doing, only one transmitter and one receiver are required to carry out the functions of the first sensor and the second sensor. Instead, the sensor may comprise e.g. a circuit with two different circuit parts, wherein one circuit part only processes the detection of a signal, i.e. by means of which an object is recognized, while the other circuit part carries out e.g. the distance determination. As a rule, the distance determination will require a more complicated electronic circuit part and therefore usually also a higher energy consumption than the circuit part that only relates to simple signal detection. Advantageously, only a common sensor or common apparatus in the form of a transmitter and a receiver is present in this development; that is to say, there is no need for two transmitters or two receivers, and so it is possible to save both costs and energy. The circuit part responsible for the distance determination is placed into a standby mode and transferred into the operating mode when an object is detected. This switchover is undertaken, as soon as an object is detected, by the circuit part that only undertakes the detection of a signal; further, it is conceivable that this circuit part itself then changes into the standby mode and returns back into the operating mode, optionally by way of the circuit part relating to the distance measurement or after a fixedly predetermined time interval, while the circuit part relating to the distance measurement thereupon returns to the standby mode in turn. In this way, firstly, only one transmitter and one receiver are in operation at any one time and, secondly, one of the two circuit parts can use less energy and be switched to standby at all times. Both circuit parts can also be combined in an integrated circuit, for example, in a microcontroller.

BRIEF DESCRIPTION OF THE DRAWINGS

An exemplary embodiment of the present invention is presented and explained in more detail below, with further details and advantages being specified.

DETAILED DESCRIPTION OF THE INVENTION

Figure 1:
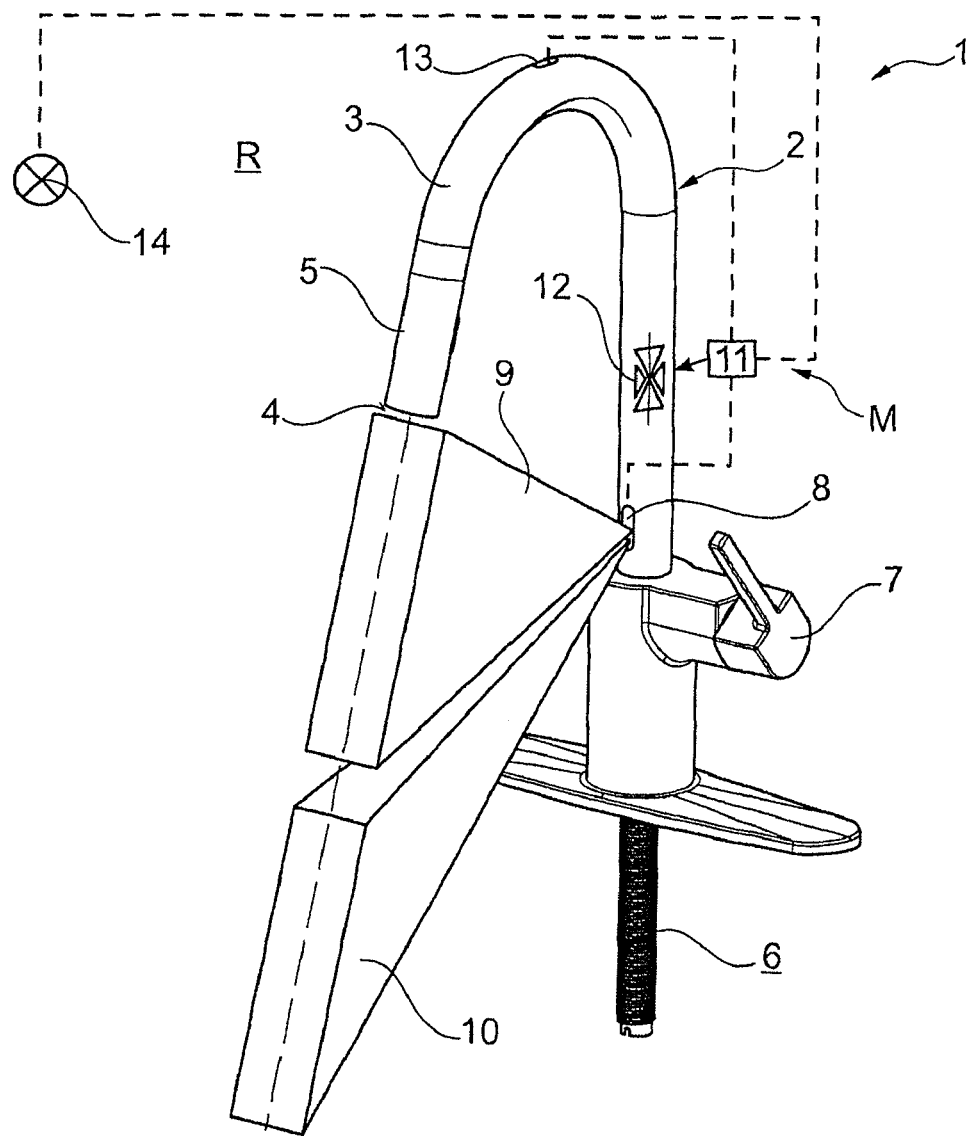
FIG. 1 shows a sanitary installation with a sanitary fitting and a monitoring apparatus according to the present invention.

FIG. 1 shows a sanitary installation 1 comprising a sanitary fitting 2, which consists of a faucet 3 with an outlet 4 and which has a monitoring apparatus M. The outlet 4 is arranged on a removable outlet piece 5 which can be drawn out of the faucet 3 by way of a hose (not depicted in any more detail here). The sanitary fitting 2 has a water supply line 6 and a lever 7 for manual actuation. A first sensor 8, which is embodied as a TOF sensor, is provided in the lower region of the faucet 3. This TOF sensor 8 can monitor different spatial regions 9, 10. The TOF sensor 8 interacts with a control unit 11 which is only plotted schematically in the present case. In turn, this control unit 11 can operate a valve 12 as an actuator for the water flow.

Moreover, provision is made of an infrared detector as a second sensor 13, the second sensor 13 being arranged in the upper region of the faucet 3 and being able to perceive whether or not a person approaches the fitting 2. Moreover, a further sensor 14 having the function of the second sensor, namely a motion detector, is also present. The latter communicates with the control unit 11 via Bluetooth, which is represented only schematically by way of a dashed connection in FIG. 1. The motion detector 14 detects whether a person enters the space. A further detection of the person is carried out by the IR detector 13. It is also conceivable to connect these three sensors 14, 13 and 8 in a cascade such that the motion detector 14 switches the sensor 13 from the standby mode into an operating mode and the sensor 13 subsequently switches the TOF sensor 8 into the operating mode. The sensors 13, 14 monitor the remaining space of the sanitary installation R.

If the person wishes to wash their hands, they can either undertake a manual actuation by way of the lever 7 or they place the hands under the faucet 3 or under the outlet 4; in this way, their hands reach into either the spatial region 9 or the spatial region 10. Optionally, the manual actuation of the lever 7 can also serve to quantitatively set the water flow. In the spatial region 9, the hand is detected by the TOF sensor 8 and the latter switches on the water via the control unit 11; however, the water has a lower pressure such that the person is not splashed wet. If the hand reaches the spatial region 10, a higher water flow is switched on as the risk of splashing water is reduced.

Should the person increase their distance again, this is initially registered by the TOF sensor 8, and so the latter can also switch off the water at the valve 12 via the control unit 11. If the person leaves the space, there likewise is no detection anymore by the sensors 13 and 14 and so, optionally in conjunction with a timer, the TOF sensor can also be switched off after a few seconds since all sensors consistently no longer supply a signal. Optionally, the control unit 11 can e.g. also switch off the light in the space in which the sanitary installation is situated.

Figure 2:
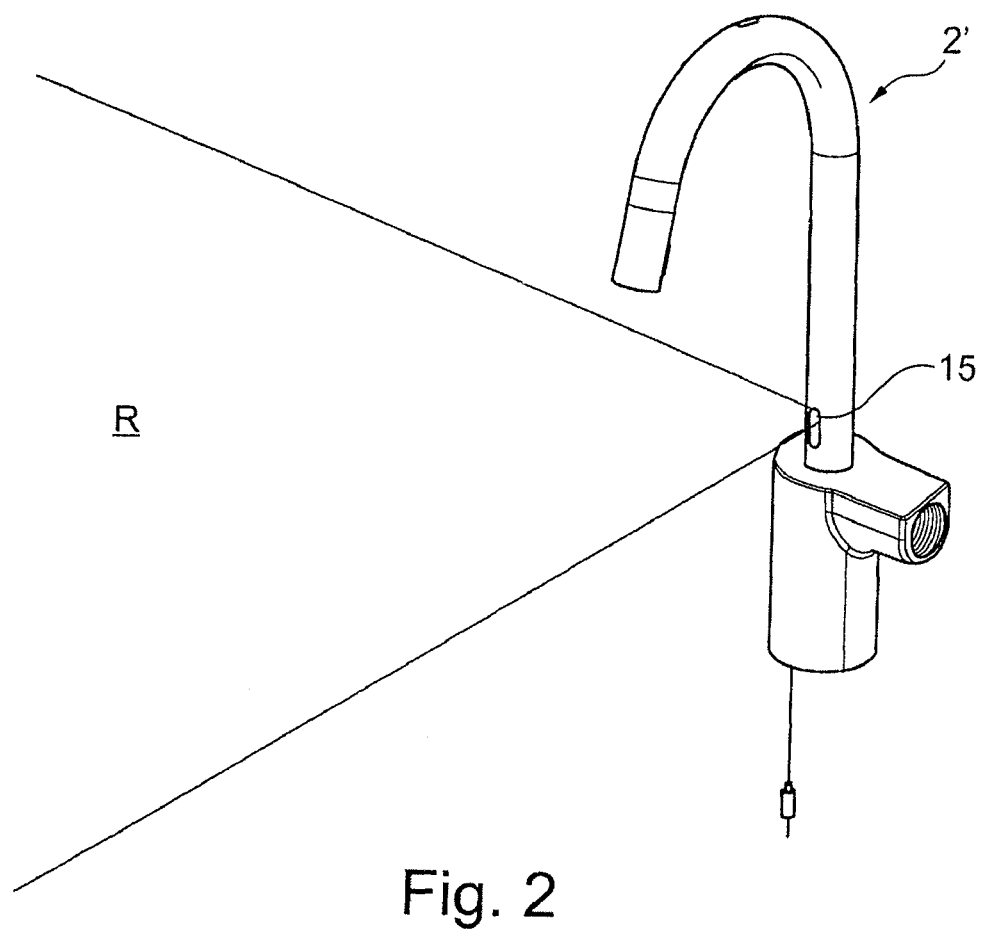
FIG. 2 shows a sanitary fitting with a common sensor according to the present invention.

FIG. 2 shows a sanitary fitting 2', in which the sensors 8, 13 for monitoring the first spatial region 9, 10 and the second spatial region R are integrated in a common sensor 15. Like in a quadrant diode, an entire detection region can be subdivided into a plurality of portions here and these portions can be assigned to the respective spatial regions. Optionally, the assignment can be effectuated by way of appropriate optics.

Figure 3:
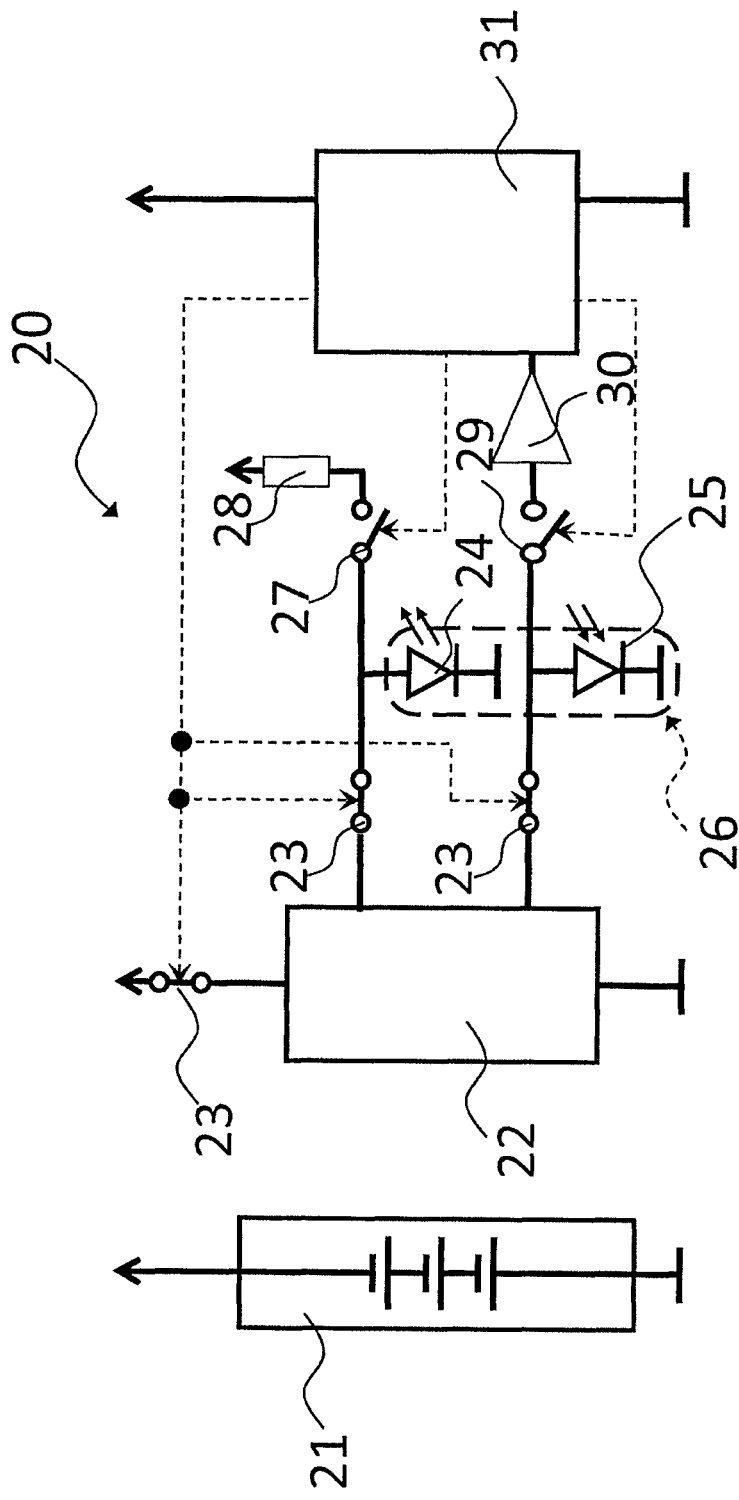
FIG. 3 shows a schematic illustration of a circuit of a common sensor with a common transmitter-receiver module according to the present invention.

FIG. 3 shows a circuit comprising a common sensor 20 with a common transmitter 24 and a common receiver 25, which both assume the functions of the first sensor and second sensor.

The two IR diodes 24, 25 are used twofold: firstly, for simple projection-monitoring presence (power saving, with a few μS transmission signals) and, secondly, for measuring the exact distance to the object (functioning as a TOF sensor 22 with a higher current consumption; measures with a few transmission signals having a duration in the millisecond range). The IR light-emitting diode 24 and the IR photodiode 25 are housed in a space-saving manner in a casing 26. This casing 26 can be installed as dedicated component in the fitting, for example, in the region of an opening for subsequent detection.

The microcontroller 31 always operates in the power saving mode (simple reflection measurement) until it detects an object. Then, there is a switchover to the power intensive measurement mode (TOF) and the distance is determined accurately. Switching the TOF sensor 22 on and off is effectuated by way of the switches 23 that are plotted schematically. Thus, a fitting saves power for most of the time. Battery-operated systems are possible (here: battery power supply 21). Further, the microcontroller 31 can respectively switch off the transmitter 24 and receiver 25 via the switches 27 and 29, respectively.

The resistor 28 serves to limit the current. The output signal of the TOF sensor 22 is supplied to the microcontroller 31 via an operational amplifier 30 as a signal amplifier.

By using at least one IR sensor for both evaluations, it is possible to select a much smaller design. Design of the fitting is only disturbed by a relatively small window; costs are saved as well.

LIST OF REFERENCE SIGNS

1 Sanitary installation
2 Sanitary fitting
2' Sanitary fitting
3 Faucet
4 Water outlet
5 Extendable outlet
6 Water supply line
7 Manually operable lever
8 TOF sensor
9 Partial spatial region
10 Partial spatial region
11 Control unit
12 Valve/actuator
13 IR detector
14 Movement detector
15 Common sensor
20 Common sensor
21 Battery
22 TOF sensor
23 ON/OFF switch for the TOF sensor
24 Transmitter IR diode (transmitter)
25 Receiver IR diode (receiver)
26 Casing for IR diodes
27 ON/OFF switch for the transmitter
28 Current restrictor (resistor)
29 ON/OFF switch for the receiver
30 Signal amplifier
31 Microcontroller with an analog input for the signal evaluation
M Monitoring apparatus
R Second spatial region

The invention claimed is:

1. A monitoring apparatus for a sanitary installation, the sanitary installation including at least a sanitary fitting having a water pipe with a discharge opening, a valve provided in the water pipe to turn water flow on and off to the water pipe, a controller adapted to control operation of the valve, an upper spatial region defined proximate to and below the discharge opening, and a lower spatial region defined proximate to and below the first spatial region, comprising a first sensor for monitoring the presence of a person in a first spatial region in the surroundings of the sanitary installation and a second sensor for monitoring a second spatial region in the surroundings of the sanitary installation, wherein the first sensor comprises an operating mode and a standby mode and the second sensor is embodied to switch the first sensor from the standby mode into the operating mode in the case of a predetermined detection, and a third sensor for detecting the person's hands in one of the upper spatial region or the lower spatial region, wherein the third sensor is adapted to send a signal, via the controller to the valve, to turn on water flow to the water pipe at a first water pressure when the third sensor detects the person's hands in the upper spatial region, and at a second water pressure greater than the first water pressure when the third sensor detects the person's hands in the lower spatial region.

2. The monitoring apparatus according to claim 1, wherein the first sensor is embodied to actuate an actuator of the sanitary installation and/or a sanitary fitting of the sanitary installation depending on the detection.

3. The monitoring apparatus according to claim 1, wherein the first sensor is embodied to monitor at least two portions of the first spatial region, said at least two portions respectively representing two different spatial regions in the surroundings of the sanitary installation, wherein the first sensor is embodied to switch the actuator of the sanitary installation on and/or off depending on the detection in one of the at least two portions, and to switch the actuator of the sanitary installation on and/or off and/or to undertake a quantitative setting of the actuator depending on the detection in another one of the at least two portions.

4. A monitoring apparatus for a sanitary installation, the sanitary installation having a water pipe with a discharge opening, a valve provided in the water pipe to turn water flow on and off to the water pipe, a controller adapted to control operation of the valve, an upper spatial region defined proximate to and below the discharge opening, and a lower spatial region defined proximate and below the first spatial region, comprising a first sensor for monitoring the presence of a person in a first spatial region in the surroundings of the sanitary installation and a second sensor for monitoring a second spatial region in the surroundings of the sanitary installation, wherein the first sensor comprises an operating mode and a standby mode and the second sensor is embodied to switch the first sensor from the standby mode into the operating mode in the case of a predetermined detection, and a third sensor for detecting the person's hands in one of the upper spatial region or the lower spatial region, wherein the third sensor is adapted to send a signal, via the controller to the valve, to turn on water flow to the water pipe at a first water pressure when the third sensor detects the person's hands in the upper spatial region, and at a second water pressure greater than the first water pressure when the third sensor detects the person's hands in the lower spatial region, and further comprising a control unit for controlling the first sensor, the control unit being embodied to switch the first sensor from the operating mode into the standby mode depending on an output signal of the first sensor and of the second sensor.

5. The monitoring apparatus according to claim 4, wherein the control unit is embodied to switch the first sensor from the operating mode into the standby mode when the first sensor and the second sensor do not detect an object, and wherein a timer apparatus is additionally provided in order to wait for a predetermined time interval until there is a switch into the standby mode of the second sensor.

6. The monitoring apparatus according to claim 1, wherein the second sensor and/or the control unit is/are embodied only to evaluate and/or forward those signals which belong to an object in a predetermined distance range.

7. The monitoring apparatus according to claim 1, wherein the second sensor is embodied as a motion detector and/or as an infrared sensor.

8. The monitoring apparatus according to claim 1, wherein the first sensor and/or the second sensor is attachable to a fitting of the sanitary installation and/or integrable into a fitting.

9. The monitoring apparatus according to claim 1, wherein the first sensor has at least two partial sensors which each monitor two different spatial regions in the surroundings of the sanitary installation.

10. The monitoring apparatus according to claim 1, wherein the first sensor and the second sensor are integrated into a common sensor which is embodied to monitor the first spatial region and the second spatial region as portions of its entire detection region.

11. The monitoring apparatus according to claim 1, wherein the first sensor and the second sensor are integrated into a common sensor which has a receiver and a transmitter common to the first sensor and the second sensor and which is embodied to detect a signal that is reflected at an object and:
   operate in a first measurement mode, in which the common sensor detects signals that are reflected at the object without a distance measurement, and
   operate in a second measurement mode, in which the common sensor determines a distance to the object from the received reflected signals,
   wherein the common sensor is embodied to switch from the first measurement mode into the second measurement mode when the object was detected in the first measurement mode.

12. The monitoring apparatus of claim 1, wherein the first sensor is a TOF sensor.

13. The monitoring apparatus of claim 2, wherein the first sensor switches on or off and/or quantitatively sets the actuator.

14. The monitoring apparatus of claim 3, wherein the two different spatial regions overlap.

15. The monitoring apparatus of claim 4, wherein the first sensor is a TOF sensor.

* * * * *